United States Patent [19]
Suzuki et al.

[11] 4,271,811
[45] Jun. 9, 1981

[54] FEEDBACK CONTROL OF EXHAUST GAS RECIRCULATION BASED ON COMBUSTION CONDITION

[75] Inventors: Suzuo Suzuki, Yokosuka; Yoshitaka Hata, Fujisawa; Akihiro Ohnishi, Koshigaya, all of Japan

[73] Assignee: Nissan Motor Company, Limited, Yokohama, Japan

[21] Appl. No.: 77,536

[22] Filed: Sep. 21, 1979

Related U.S. Application Data

[62] Division of Ser. No. 825,130, Aug. 16, 1977, Pat. No. 4,186,701.

[30] Foreign Application Priority Data

Aug. 23, 1976 [JP] Japan .................................. 51-100434

[51] Int. Cl.³ ................................................ F02B 47/08
[52] U.S. Cl. .................................................... 123/571
[58] Field of Search ................. 125/571, 568, 425, 407

[56] References Cited

U.S. PATENT DOCUMENTS

| | | | |
|---|---|---|---|
| 3,872,846 | 3/1975 | Taplin et al. | 123/568 |
| 3,977,373 | 8/1976 | Sand | 123/425 |
| 4,008,697 | 2/1977 | Konno | 123/407 |

*Primary Examiner*—Wendell E. Burns
*Attorney, Agent, or Firm*—Schwartz, Jeffery, Schwaab, Mack, Blumenthal & Koch

[57] ABSTRACT

To effect EGR in an internal combustion engine with the maintenance of adequate balance between the suppression of $NO_x$ formation and preservation of stable engine operation, the condition of combustion in the engine is taken as the basis of feedback control of the volume of recirculated exhaust gas so as to correct a deviation of the total amount of the recirculated exhaust gas and unexhausted combustion gas in the combustion chamber from a desired amount. The intensity of an ionic current produced upon combustion in each combustion chamber, the magnitude of mechanical vibration of the engine or the frequency of misfire in a combustion chamber is detected as an exact indication of the condition of combustion.

4 Claims, 6 Drawing Figures

FEEDBACK CONTROL OF EXHAUST GAS RECIRCULATION BASED ON COMBUSTION CONDITION

This is a division, of application Ser. No. 825,130, filed Aug. 16, 1977 now U.S. Pat. No. 4,186,701 of Feb. 5, 1980.

BACKGROUND OF THE INVENTION

This invention relates to a feedback control system for controlling the recirculation of exhaust gas through an internal combustion engine, which system has a combustion condition sensor to provide a feedback signal.

Concerning the prevention of air pollution by exhaust gas of internal combustion engines, the recirculation of a portion of exhaust gas back into the engine intake is probably the most widely employed technique for suppressing the emission of $NO_x$. The recirculation of exhaust gas (EGR) has the effect of lowering the maximum combustion temperature in the engine combustion chambers so that the formation of $NO_x$ in the combustion chambers can be suppressed.

The suppressive effect of EGR on the formation of $NO_x$ is enhanced as the volume of the recirculated exhaust gas relative to the volume of fresh air admitted into the engine is increased (this volume ratio will herein be referred to as EGR rate). To maintain $NO_x$ emission below a permissible level, there is a need of effecting EGR at considerably high EGR rates. On the other hand, the employment of high EGR rates tends to cause instability of the engine operation. Since the recirculated exhaust gas serves as an inert diluent to a combustible gas mixture, not only the maximum combustion temperature but also the combustion pressure lowers as the EGR rate is enhanced. Accordingly the EGR rate should be controlled in dependence on the engine operating condition so as to maintain an adequate balance between the suppression of $NO_x$ emission and the preservation of a stable engine operation, and high precision is required of the control especially when high EGR rates are involved in the scope of the control.

In conventional EGR control systems, it is a usual way of operting an EGR control valve to employ a vacuum-operated actuator which is connected to the induction passage of the engine, so that the EGR control valve is operated in dependence on the magnitude of vacuum either at a venturi section of the induction passage or in the neighborhood of a throttle valve. In this type of control systems, the control is accomplished in a programmed manner so as to regulate the EGR rate to a target value which is preset based on an assumed relationship between the EGR rate or the aforementioned vacuum and the condition of the combustion in the engine.

The venturi section vacuum, for example, is of course an indication of the engine operating condition, but there is a limitation to the precision in the control of EGR when the EGR control valve is directly operated by such vacuum. Furthermore, the rate of EGR in a programmed control system chances to remain constant even though a substantial fluctuation occurs in an actual or realized EGR rate as a result of changes in the engine operating condition. Sometimes the operation of the engine temporarily loses stability from this reason. The instability of the engine operation resulting from a deviation of a realized EGR rate from an intended EGR rate is a matter of great concern particularly when EGR is effected up to a very high EGR rate, for example, about 40%, as in an engine system featuring "two-point ignition" in each combustion chamber, proposed by research workers of Nissan Motor.

SUMMARY OF THE INVENTION

It is an object of the present invention to provide an EGR control system of a feedback control type for internal combustion engines.

It is another object of the invention to provide an EGR control system for internal combustion engines, which control system includes a combustion condition sensor to accomplish a feedback control of the rate of EGR based on the condition of combustion in the engine, that is, an exact indication of a realized EGR rate.

An EGR control system according to the invention comprises a flow control valve to regulate the volume flow rate of the exhaust gas in an exhaust recirculation passage, a sensor means for sensing the condition of combustion in a combustion chamber of the engine and producing a first electrical signal representing the sensed combustion condition, a control circuit for producing a second electrical signal based on the first signal, which second signal indicates a decrease in the aforementioned volume flow rate of the exhaust gas when the first signal implies that the condition of combustion approaches unstableness, and an actuator means for operating the control valve in response to the second signal.

This EGR control system is characterized in that the condition of combustion is taken as the basis of feedback control. The combustion condition, typically represented by the rate of combustion, is affected by the total volume of the recirculated exhaust gas and the unexhausted combustion gas in the combustion chamber relative to the volume of fresh air-fuel mixture, so that the feedback control of the volume of the recirculated exhaust gas based on the combustion condition can maintain a stable combustion even when an abrupt change occurs in the engine operating condition.

The condition of combustion can directly be detected by inserting a needle-like probe into the combustion chamber so as to produce an ionic current in the combustion chamber when combustion occurs therein since the intensity of the ionic current is proportional to the product of the ion density and the rate of combustion.

The combustion condition can be detected also by measuring the magnitude of mechanical vibration of the engine using a conventional vibration pickup since the vibration intensifies as the combustion condition approaches unstableness as the result of an increase in the aforementioned total volume of the recirculated exhaust gas and unexhausted combustion gas.

Furthermore, it is also possible to detect the combustion condition by detecting the frequency of misfire in the combustion chambers. This can be accomplished by disposing a spark-gap in the exhaust passage at a section where exhaust gas retains a sufficiently high temperature and detecting the frequency of sparking across the spark-gap.

The actuator means preferably include a vacuum-operated valve actuator and an electromagnetic valve which regulates the magnitude of vacuum applied to the actuator in response to the output of the control circuit.

DESCRIPTION OF PREFERRED EMBODIMENTS

Figure 1:
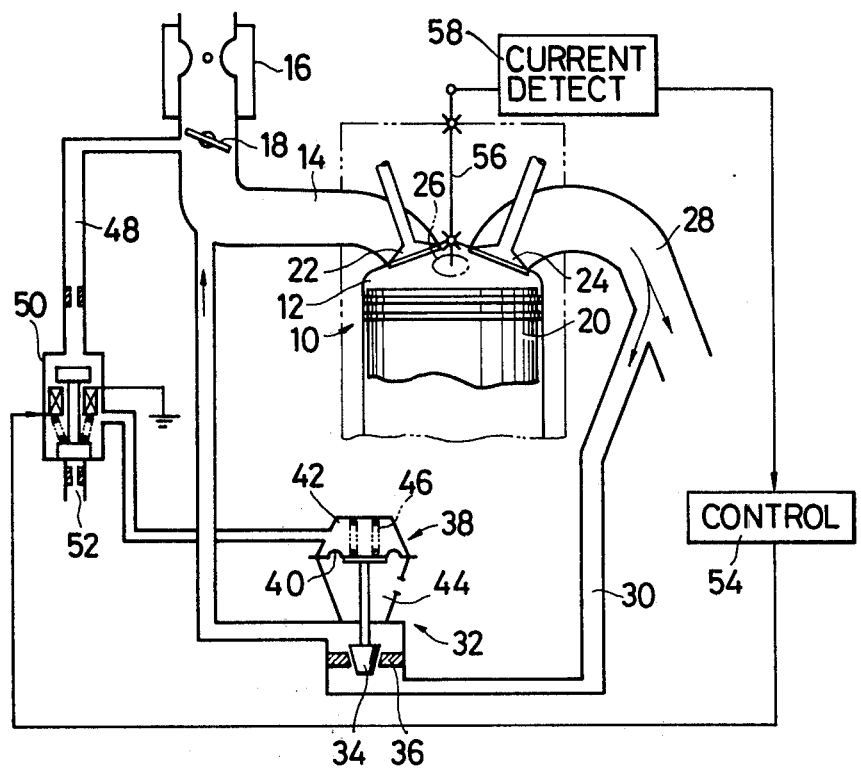
FIG. 1 is a diagrammatic presentation of an exhaust gas recirculation system as an embodiment of the invention.

An EGR control system shown in FIG. 1 as a first embodiment of the invention is characterized in that a feedback signal representing the condition of combustion in each combustion chamber 12 of an internal combustion engine 10 is produced by measuring an ionic current produced in the combustion chamber 12.

A fuel system for this engine 10 has an induction passage 14 equipped with a carburetor 16 and a throttle valve 18. The combustion chamber 12 is defined in an engine cylinder above a piston 20 with the provision of an intake valve 22, an exhaust valve 24 and a spark plug 26 in the usual manner. An exhaust gas recirculation (EGR) passage 30 branches from an exhaust passage 28 to interconnect it to the induction passage 14 downstream of the throttle valve 18 for the purpose of recirculating a portion of the exhaust gas to the combustion chamber 12. A conventional EGR control valve 32 is associated with the EGR passage 30 to control the volume flow rate of the exhaust gas through this passage 30. In the illustrated case, the control valve 32 has a tapered valve member 34 axially movable in an orifice 36 formed in the passage 30. A vacuum-operated valve actuator 38 for moving the valve member 34 has a diaphragm 40 which holds the stem of the valve member 34 and serves as a partition between a vacuum chamber 42 and an atmospheric pressure chamber 44. A spring 46 is installed in the vacuum chamber 42 to bias the diaphragm 40 towards the atmospheric pressure chamber 44. An intake vacuum produced by the operation of the engine 10 is applied to the vacuum chamber 42 through a conduit 48, and the valve member 34 is arranged such that an effective cross-sectional area of the orifice 36 increases as the magnitude of vaccum applied to the chamber 42 increases.

An electromagnetic valve 50 is associated with the vacuum transmission conduit 48 to admit a variable quantity of air into this conduit 48 through an air admission passage 52 and is operated by the output of an electronic control circuit 54. A needle-like probe 56 is inserted into the combustion chamber 12. On the outside of the engine 10, this probe 56 is connected to a DC power source (not shown) such that a voltage $V_p$ can be impressed across the probe 56 and the wall of the combustion chamber 12. The output of the probe 56 is put into the control circuit 54 via an ionic current detection circuit 58.

Upon combustion of a combustible gas mixture in the combustion chamber 12, there occurs ionization of a portion of the combustion gas. Accordingly the impression of the voltage $V_p$ on the probe 56 during the combustion causes a discharge across the probe 56 and the wall of the combustion chamber 12 with the production of an ionic current I. The intensity of the ionic current I is given by the following general formula:

$$I \alpha L \cdot N_i^{0.75} \cdot U^{0.75} \cdot V_p^{0.5} \qquad (1)$$

where L is the length of the probe 56 protruded into the combustion chamber 12, $N_i$ is the ion density, and U is the velocity of the combustion gas relative to the probe 56 (the rate of combustion). The density $N_i$ and the rate of combustion U depend on the amount of the combustion gas retained in the combustion chamber 12 at the start of the combustion, that is, the total amount of the unexhausted combustion gas and the recirculated exhaust gas. Accordingly the ionic current I represents the rate of combustion or the condition of combustion.

Figure 2:
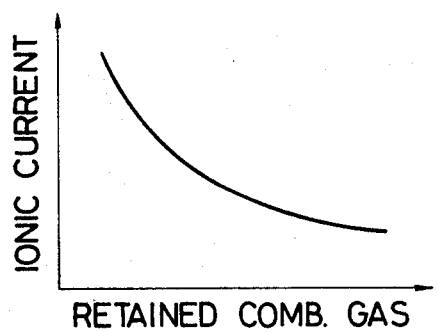
FIG. 2 is an explanatory graph showing the relationship between the quantity of combustion gas retained in a combustion chamber and an ionic current produced in the combustion chamber under a fixed discharge condition.

FIG. 2 shows the dependence of the ionic current I on the aforementioned amount of the retained combustion gas. The ionic current I decreases as the amount of the retained combustion gas increases.

It is possible, therefore, to know the proportion of the retained combustion gas to the fresh air-fuel mixture and estimate the rate of combustion by measuring the ionic current I. The detection circuit 58 supplies a feedback signal representing the intensity of the ionic current I to the control circuit 54. In the control circuit 54, this signal is compared with a reference signal which implies a current intensity corresponding to an intended amount of the retained combustion gas, that is, a desired EGR rate as the aim of the control. The output of the control circuit 54 is a power signal for operating the electromagnetic valve 50 and varies so as to cancel any deviation of the input signal from the reference signal by regulating the admission of air into the vacuum transmission conduit 48 through the electromagnetic valve 50. This means the regulation of the magnitude of vacuum applied to the actuator 42 such that the opening area of the EGR control valve 32 is varied until the realization of an intended EGR rate.

The control system may optionally comprise additional sensors (not shown) for utilizing some variables relating to the operating condition of the engine 10, for example engine speed and/or intake vacuum, also as inputs to the control circuit 54 with the purpose of modifying the output of the circuit 54 such that the EGR rate is lowered when the engine 10 is operated under certain condition requiring particularly smooth and/or efficient engine operation as exemplified by a high speed low load condition and a low speed high load condition.

There will be no need of explaining the particulars of the control circuit 54 since analoguous electronic control circuits are well known with regard to feedback control of air-to-fuel ratio in intake systems for internal combustion engines.

The EGR control system of FIG. 1 is based on the following way of thinking.

Some portion of the combustion gas produced at each engine cycle is left unexhausted from the combustion chamber 12. The retained combustion gas is not different from the recirculated exhaust gas except for temperature, so that the extent of the suppression of $NO_x$ formation through lowering in the rate of combustion and maximum combustion temperature depends on the total amount of the recirculated exhaust gas and the retained combustion gas. It is quite desirable, therefore, that the amount of the retained combustion gas too is taken into account in controlling the rate of EGR. However, the amount of the retained combustion gas exhibits a great variation with changes in the engine operating condition, and it is not easy to regulate the rate of EGR in response to such variation in the amount of the retained combustion gas. Accordingly this variation has been left out of consideration in conventional EGR control systems: the volume of the recirculated exhaust gas has been regulated exclusively in accordance with the volume of admitted air represented by the magnitude of vacuum at a certain section of the induction passage. It has been inevitable, therefore, that a considerable fluctuation occurs in the proportion of the combustion gas to the fresh gas mixture in the combustion chamber, causing an intermittent variation in the operability of the engine, with changes in the engine operating condition even when the rate of EGR is controlled as intended.

The above described problem remains unsolved even when a feedback control is accomplished by detecting the quantity of actually recirculated exhaust gas. There is a need of detecting also the volume of the unexhausted combustion gas relative to the volume of fresh mixture admitted at each intake stroke. However, it is not essentially necessary to detect the volumes of the recirculated exhaust gas and the unexhausted combustion gas since these two differently called gases are substantially of the same nature. In the control system of FIG. 1, it is intended to almost directly detect the total volume of the recirculated exhaust gas and the unexhausted combustion gas (these two gases will collectively be referred to as "diluent gas" for brevity) relative to the volume of fresh mixture or the volume of the combustion chamber. Although the ionic current I is not direct indication of the volume of the diluent gas, the rate of combustion U as a primary factor affecting the ionic current I is an exact indication of the volume of the diluent gas. Accordingly the control system of FIG. 1 can accomplish a precise control of EGR in best accordance with actual condition of combustion, a principal factor in the formation of $NO_x$, under every operating condition of the engine without the need of measuring the flow rate the exhaust gas in the recirculation passage.

The operation of the EGR control system of FIG. 1 will have already been grasped. If the volume of the diluent gas in the combustion chamber 12, detected by the probe 56 and the detection circuit 58 and transmitted to the control circuit 54, is larger than an intended volume, meaning that the intensity of the detected ionic current I is below an expected current intensity represented by a reference signal, the control circuit 54 accomplishes a corrective function so as to provide a power signal to the electromagnetic valve 50 to allow the admission of a sufficiently large quantity of air into the vacuum conduit 48 thereby to decrese the magnitude of vacuum applied to the actuator 38. Then the diaphragm 40 deflects towards the atmospheric pressure chamber 44 with the result that the valve member 34 changes its position to decrease an effective cross-sectional area of the orifice 36. Consequently a decrease occurs in the volume of the recirculated exhaust gas. The oput of the control circuit 54 continues to fluctuate until realization of an intended volume of the diluent gas in the combustion chamber 12. When the detected ionic current I is greater than the expected one, the opening area of the control valve 32 is increased by diminishing or interrupting the admission of air into the vacuum conduit 48 through the electromagnetic valve 50. Thus any deviation of the proportion of the diluent gas to the air-fuel mixture in the combustion chamber 12 from an intended proportion can quickly be cancelled.

The control system of FIG. 1 is quite effective for maintaining the relative volume of the diluent gas in the combustion chamber 12 almost constantly at a preset value, even when an abrupt and great increase occurs in the amount of the unexhausted combustion gas under, for example, a decelerating condition. It is possible, therefore, to maintain a stable combustion or stable engine operation under every operating condition of the engine 10 and effectively accomplish the object of diminishing the emission of $NO_x$.

Figure 3:
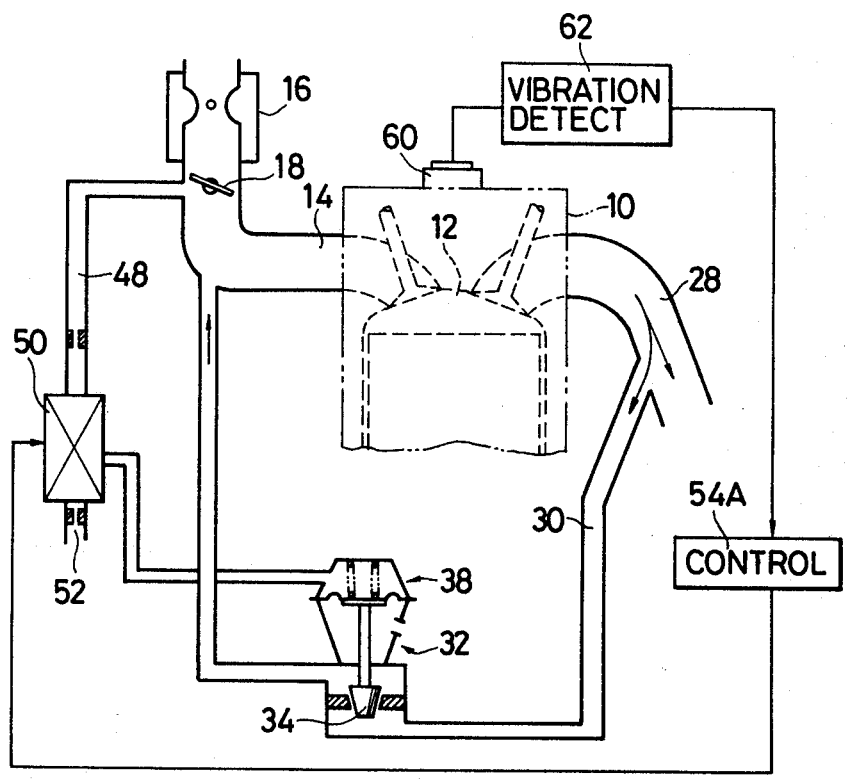
FIG. 3 shows a modification of the control system of FIG. 1 as another embodiment of the invention.

FIG. 3 shows an EGR control system which is generally similar to the control system of FIG. 1 but utilizes mechanical vibration of the engine 10, instead of the ionic current I in the case of FIG. 1, for producing a feedback signal representing actual condition of combustion in the combustion chamber 12.

As is commonly recognized, mechanical vibration of the engine 10 intensifies as the combustion in the combustion chamber 12 tends towards instability as the result of an increase in the relative volume of the diluent gas. It is possible, therefore, to estimate the condition of combustion and the relative volume of the diluent gas in the combustion chamber 12 with accuracy from the magnitude of the engine vibration.

In FIG. 3, a vibration pickup 60 is mounted on the body of the engine 10. The vibration pickup 60 is of an electric type such as moving magnet type, piezoelectric type or a strain gauge type. The output of the pickup 60 is transmitted to an electronic control circuit 54A, which is fundamentally similar to the control circuit 54 in FIG. 1, via a vibration detection circuit 62. In other respects (of course the probe 56 and the ionic current detection circuit 58 are excluded) the control system of FIG. 3 is identical with the system of FIG. 1. The control circuit 54A provides a variable power signal to the electromagnetic valve 50 based on the deviation of the engine vibration signal supplied from the vibration sensing means 60, 62 from a reference signal representing an expected magnitude of the vibration corresponding to an intended amount of the diluent gas in the combustion chamber 12. The control of the function of the valve actuator 38 by the electromagnetic valve 50 is the same as in the control system of FIG. 1.

The performance of the control system of FIG. 3 is fundamentally similar to that of the control system of FIG. 1. As a particular advantage of the control system of FIG. 3, the rate of EGR can naturally be lowered when the engine 10 is operated under a condition which is liable to cause instability in the engine operation but does not allow the formation of a large quantity of $NO_x$ as exemplified by an abruptly decelerating condition or idling condition. A sharp increase occurs in the mangitude of the intake vacuum during, for example, an abrupt deceleration, so that both the maximum combustion temperature and the rate of combustion exhibit considerable lowering because of a decrease in the compression pressure and an increase in the amount of unexhausted combustion gas, resulting in a great diminishment of the generation of $NO_x$. It is desirable, therefore, that the rate of EGR be greatly lowered, even to zero, under such a condition. Since the magnitude of the engine vibration is detected as a feedback signal, the control system of FIG. 3 can lower the rate of EGR in good response to a change for the worse in the combustion condition under the above described condition.

Figure 4:
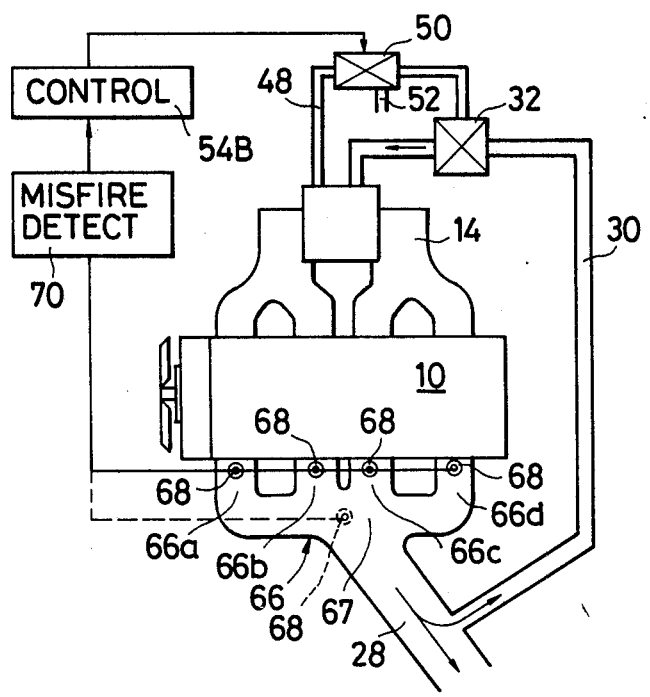
FIG. 4 is a diagrammatic presentation of a still different EGR control system also as an embodiment of the invention.

As a still different embodiment of the invention, FIG. 4 shows an EGR control system in which a feedback signal is produced by detecting the frequency of misfire in the engine 10 as an indication of the condition of combustion. When EGR is effected, an increase in the relative volume of the diluent gas causes an increase in the frequency of misfire in the engine combustion chambers.

Figure 5:
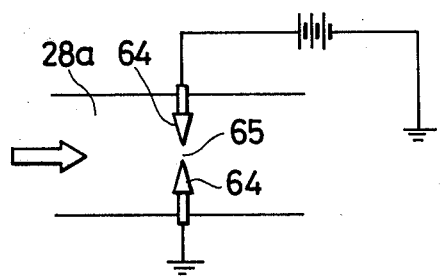
FIG. 5 shows the principle of a misfire sensor employed in the control system of FIG. 4.

FIG. 5 shows the principle of a misfire sensor employed in the control systems of FIG. 4. A pair of needle-shaped electrodes 64 are disposed in the exhaust passage 28 at a section 28a not far distant from the combustion chambers (so that the exhaust gas has a sufficiently high temperature at this section 28a) with a suitable gap between their tips so as to provide a spark gap 65, and an appropriate voltage is continously impressed across these electrodes 64. The spark-gap 65 and the impressed voltage are adjusted such that spark is produced across the gap 65 while exhaust gas passing through the gap 65 is truly a combustion gas (accordingly ions are present in the exhaust gas). If the exhaust gas contains a certain amount of unburned air-fuel mixture, the spark is produced at a less frequency because of a lowering in the ion density in the exhaust gas. No spark will be produced when the amount of the unburned air-fuel mixture increases to a certain level. An increase in the amount of unburned air-fuel mixture in the exhaust gas means an increase in the frequency of misfire in the engine combustion chambers, so that the frequency of misfire can be estimated from the frequency of the sparking across the gap 65. The occurrence of each spark can be detected as a spark-discharge current.

Figure 6:
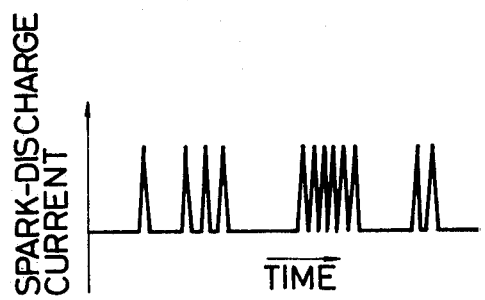
FIG. 6 is a chart showing a variation in the output of the misfire sensor of FIG. 5.

The engine 10 in FIG. 4 is provided with an exhaust manifold 66, and a misfire sensor 68 having the spark-gap 65 is disposed in each of the manifold branches 66a, 66b, 66c and 66d. However, it is permissible to provide the misfire sensor(s) to only a portion of the manifold branches 66a, 66b, 66c, 66d. Still alternatively, a single misfire sensor 68 may be disposed in a region 67 where join the exhaust streams from all the manifold branches 66a, 66b, 66c, 66d. The output of the misfire sensors 68 is transmitted to a control circuit 54B, which is fundamentally similar to the control circuit 54 in FIG. 1, via a misfire or spark-discharge current detection circuit 70. The output of the circuit 70 takes the form of a pulse signal as illustrated by a model of FIG. 6 (assuming that a variation occurs in the amount of unburned air-fuel mixture in the exhaust gas). Accordingly the control circuit 54B is so constructed as to count the number of the current pulses per a definite amount of time. Alternatively the current of the pulses may be integrated over a definite amount of time.

In the control system of FIG. 4, a decrease in the frequency of the sparking means an increase in the misfire frequency and hence an increase in the relative volume of the diluent gas in the combustion chambers. Then the control circuit 54B varies its output so as to lower the rate of EGR through the operation of the electromagnetic valve 50 which regulates the magnitude of vacuum applied to the control valve 32. This control circuit, therefore, accomplishes a precise feedback control of EGR, or the amount of the diluent gas, regardless of the operating condition of the engine 10 with good responsiveness and precision required for precluding a substantially unstable engine operation similarly to the control systems of FIGS. 1 and 3.

What is claimed is:

1. A feedback control system for controlling the volume of exhaust gas recirculated from an exhaust passage of an internal combustion engine to the induction passage of the engine through an exhaust recirculation passage, the system comprising:

a flow control valve to vary the volume flow rate of the exhaust gas in the exhaust recirculation passage;

a sensor means for sensing the condition of combustion in a combustion chamber of the engine and producing a first electrical signal representing the sensed combustion condition, said sensor means comprising a spark-gap disposed in the exhaust passage to detect the frequency of misfire in said combustion chamber by the frequency of a spark-discharge across said spark-gap;

a control means for producing a second electrical signal based on said first electrical signals, said second electrical signal indicating a decrease in the volume flow rate of the exhaust gas in the recirculation passage when said first electrical signal implies a decrease in the frequency of said spark-discharge in said combustion chamber; and an actuator means for operating said control valve in response to said second electrical signal.

2. A feedback control system as claimed in claim 1, wherein said actuator means comprise a vacuum-operated actuator for operating said control valve connected to the induction passage by a vacuum transmission passage such that the opening area of said control valve increases as the magnitude of vacuum transmitted to said actuator increases and an electromagnetic valve arranged to admit a variable quantity of air into said vacuum transmission passage in response to said second electrical signal.

3. A method of controlling the recirculation of a portion of exhaust gas through an internal combustion engine, comprising the steps of:

detecting the condition of combustion in a combustion chamber of the engine by detecting the frequency of misfire in said combustion chamber to produce an electrical first signal representing the detected condition;

producing an electrical second signal based on said first signal, said second signal indicating a decrease in the volume of the recirculated exhaust gas when said first signal implies that the detected combustion condition approaches an unstable condition corresponding to an increase in said misfire frequency; and varying the volume of the recirculated exhaust gas based on said second signal.

4. A method as claimed in claim 3, wherein said frequency of misfire is detected by detecting the frequency of spark-discharge across a spark-gap disposed in an exhaust passage of the engine at a section where the exhaust gas has a sufficiently high temperature, said second signal indicating said decrease when said first signal implies a decrease in the frequency of said spark-discharge.

* * * * *